United States Patent [19]

Kingsland et al.

[11] Patent Number: 4,666,293
[45] Date of Patent: May 19, 1987

[54] FLEXIBLE DOCUMENT PLATEN

[75] Inventors: David O. Kingsland; Edward A. Schwartz, both of Fairport; Joseph G. Mestnik, Rochester, all of N.Y.

[73] Assignee: Xerox Corporation, Stamford, Conn.

[21] Appl. No.: 820,285

[22] Filed: Jan. 17, 1986

[51] Int. Cl.⁴ .............................................. G03B 27/62
[52] U.S. Cl. ...................................................... 355/75
[58] Field of Search .......................... 355/3 BE, 16, 75

[56] References Cited

U.S. PATENT DOCUMENTS

| | | | |
|---|---|---|---|
| 2,226,157 | 12/1940 | Christie et al. | 95/73 |
| 2,638,827 | 5/1953 | Leavitt et al. | 95/73 |
| 2,970,514 | 2/1961 | Collins | 355/75 X |
| 4,154,526 | 5/1979 | Kostiner | 355/74 |
| 4,566,787 | 1/1986 | Lüllau | 355/100 |

Primary Examiner—Richard A. Wintercorn

[57] ABSTRACT

The present invention is directed toward a flexible plastic platen used as a document support surface in a copying/printing machine. The platen, in a preferred embodiment, is an optically clear polycarbonate sheet, inexpensive and easy to handle. The platen is mounted in a machine frame so as to be slightly flexed upward along a width area corresponding to the area to be scan-illuminated to ensure accurate focusing of the document image through an underlying linear lens array. The platen is easily replaced by releasing the tension and lifting the platen out of a seated position.

5 Claims, 2 Drawing Figures

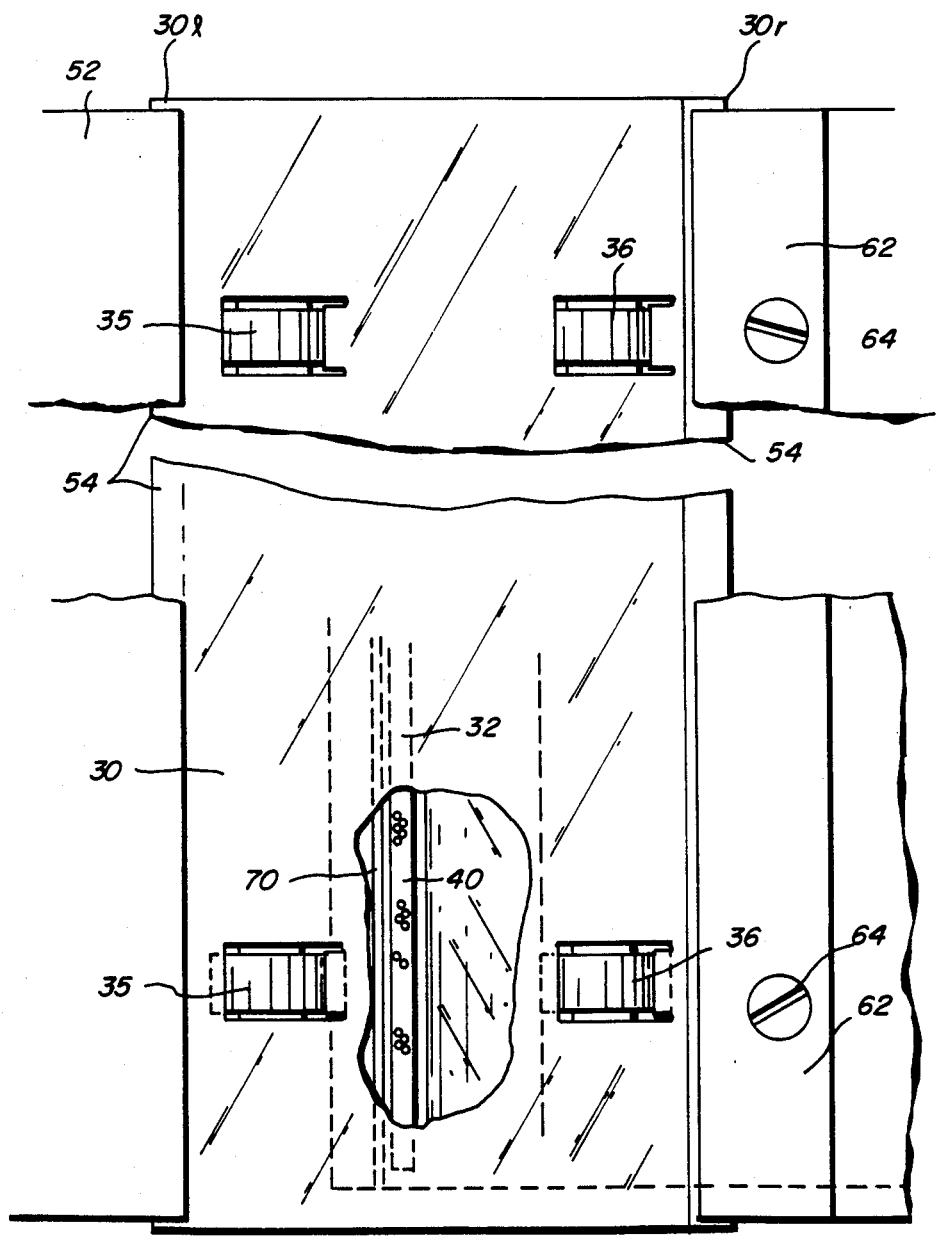

FLEXIBLE DOCUMENT PLATEN

This invention relates to a transparent document support platen and, more particularly, to an inexpensive flexible plastic platen which is easily replaceable in the field.

Prior art document coping and printing machines generally provide a rectangular glass platen, framed by the chassis of the machine, to support a document to be copied. The document is placed face down on the platen and illuminated by a lamp located beneath the surface of the platen. A document image is then directed along an optical path through a projection lens to form a laten image of the document on a photosensitive exposure surface. The quality of the document exposure, and hence the quality of the output copy, following development and transfer steps, can be adversely affected by any imperfections in the transmission qualities of the platen. During usage, platens are subject to stress created by the heating effects of the documents illumination lamps and by scratches incurred during machine operation. For machines employing a transport device for moving the document across of the platen, surface abrasion becomes a problem with continued usage. All of these factors reduce the efficiency of the light transmission the platen since light tends to be diffusely reflected from the stressed or scored areas. Eventually, these platens must be replaced. The cost of a new glass platen can be substantial and the replacement procedures are time consuming and expensive.

It is desirable to provide a platen which is less expensive than the presently used glass and which is easier to handle and to replace. The present invention is therefore directed to a document imaging system comprising a flexible transparent platen positioned in an object plane for supporting a document to be reproduced, and means for incrementally scanning a document on said platen, said means including an optical illumination and assembly for illuminating an incremental strip extending across the platen width and for projecting a document image along an optical path onto a photosensitive image plane. In a preferred embodiment, the platen is spring-biased into its seated position by being slightly flexed over a fixed support bar thereby imparting required rigidity to the platen along the incrementally illuminated scan area.

BRIEF DESCRIPTION OF THE DRAWINGS

FIG. 2 is a partial top view of the seated platen.

DESCRIPTION

Figure 1:
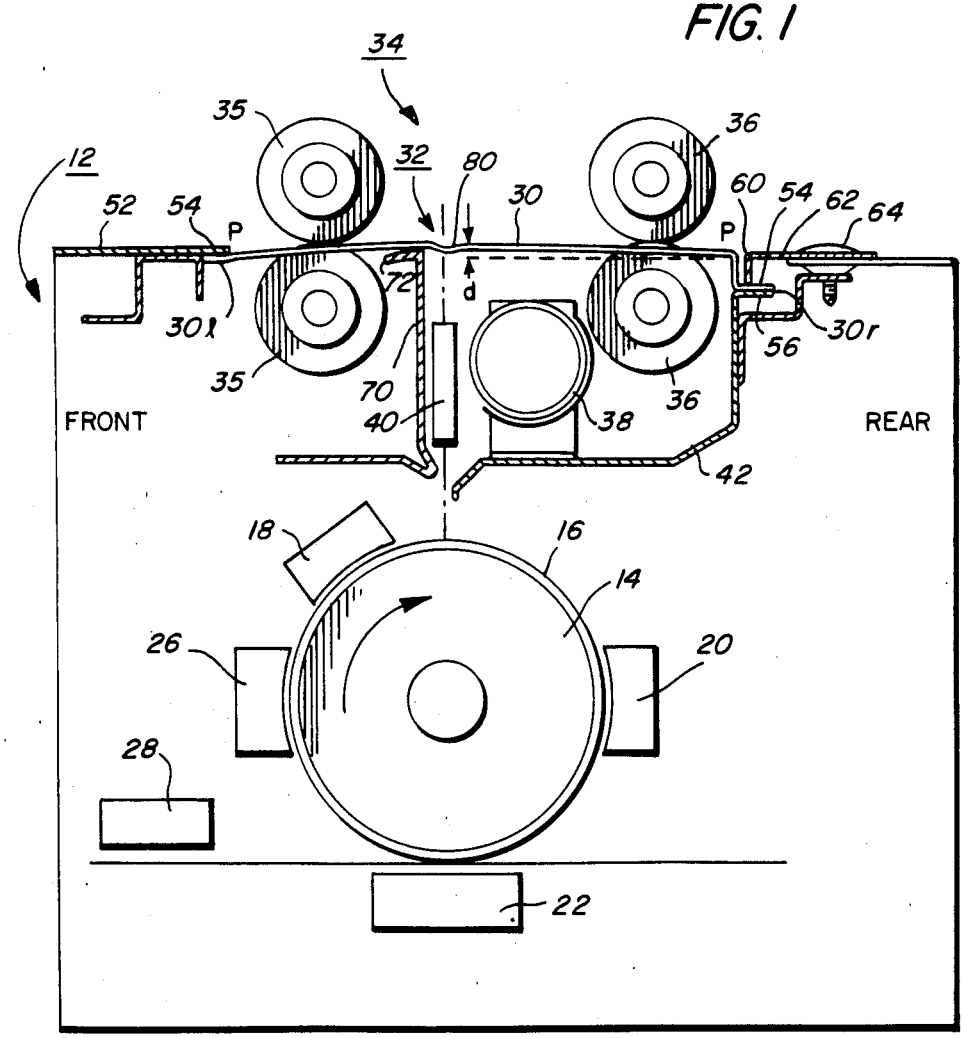
FIG. 1 is a side schematic view of a copying/printing machine incorporating the flexible platen of the present invention.

Referring to FIG. 1 of the drawings, there is shown a xerographic type reproduction machine 8 incorporating the flexible platen of the present invention. Machine 8 is particularly adapted to copy documents having long widths such as blueprints and the like, but the platen is not necessarily limited to this embodiment. Machine 8 has a suitable frame 12 within which the xerographic components and stations are operatively supported. Briefly, and as will be familiar to those skilled in the art, the machine xerographic components include a recording member, shown here in the from of a rotatable drum photoreceptor 14 having a photoconductive surface 16. Other photoreceptor types such as belt, web, etc. may be used instead. Operatively disposed about the periphery of drum 14 are charge station 18, for placing a uniform charge on the photoconductive surface; exposure station 19 where the previously charged surface 16 is exposed to image rays of a document (not shown) being copied or reproduced; development station 20 where the latent electrostatic image created on photoconductive surface 16 is developed by toner; transfer station 22 for transferring the developed image to a suitable copy substrate material such as a copy sheet 24 brought forward in timed relation with the developed image on surface 16, and cleaning station 26 for removing leftover developer from surface 16 and neutralizing residual charges thereon. Following transfer, sheet 24 is carried forward to a fusing station 28 where the toner image is fixed. These xerographic processing stations, and the steps incident to operation thereof, are well-known in the prior art as exemplified by the disclosure of U.S. Pat. No. 4,397,409 whose contents are hereby incorporated by reference.

Referring again to FIG. 1, and according to the present invention, a transparent flexible platen 30 supports a document which is fed from the left hand side of the Figure (front of the machine) and is moved past a scan strip area 32 by a constant velocity type transport 34. As will be understood, scan strip 32 is, in effect, a narrow width scan line extending across the width of platen 30 (into the page) at a desired point along the platen where the document is scanned line by line as the document is moved along the platen surface by transport 34. Transport 34 has two sets of input and output feed roll pairs 35,36, respectively, on each side of scan strip 32 for moving a document across platen 30 at a predetermined speed. Exposure lamp 38 is provided to illuminate scan strip 32. The image rays from the document line scanned are projected and focused by a gradient index fiber lens array 40 having sufficient length to expose the photoconductive surface 16 of the moving drum 14 at exposure station 19. Lamp 38 and array 40 are located within housing 42. In a preferred embodiment, lens array 40 is an SLA 6 SELFOC lens. SELFOC is a trademark of the Nippon Sheet Glass Company of Japan.

Platen 30, in a preferred embodiment, is formed of an optically clear polycarbonate sheet 1.5 mm thick, 150 mm long and 1100 mm wide. The details of the platen mounting are described below with continued reference to FIGS. 1 and 2. Machine 8 includes, along its top surface, a front feed-in shelf 52 located adjacent the left side of the platen as viewed in FIG. 1. This shelf provides a convenient support for support for documents to be copied and also serves to locate left edge 30(l) of the platen. The other right edge 30(r) of the platen is defined by a downwardly-extending lip 54. Lip 54 held in firm contact with the underlying shelf 56, part of housing 42, by lip 60 of rear cover 62. Cover 62 is mounted to the housing 42 by a pair of screws 64. According to a feature off the present invention, the platen, in its seated position, assumes a bowed configuration by being flexed over the top of support bar 70. Referring to FIGS. 1 and 2, support bar 70 is an elongated, rectangular-shaped member extending the width of the machine. It is fixedly mounted to the machine frame in a position such that the top edge 72, shown slightly curved in a preferred embodiment, extends a small distance d above the document object plane denoted by the axis line P—P, and a short distance upstream of the scan strip 32. The value of d for the present embodiment is 1.2 mm.

Bar 70 creates a bowed section 74 of the platen resulting in a a rigid, very stable area extending along scan strip 32. The document being conveyed over platen 30 its thus guided and held between the feed rollers such that the portion of the document which is being illuminated along scan strip 32 will be in a precisely controlled position with respect to the entrance face of the lens array 40. This orientation assures optimum focusing during each copying cycle. Without this tensioned arrangement, tthe platen might be subject to a slight vertical flexing motion during scan which impairs the quality of the image at the exposure plane. The bowed orientation of the platen also enables platen replacement as described below.

As indicated in the introductory remarks, platens must occasionally be replaced because of impairment of the light transmission qualities. The platen of the present invention is easily removed by the following procedure. Referring to FIGS. 1 and 2, screws 64 holding the rear cover 62 are removed and the cover is lifted away from the machine. This action effectively releases platen over the top of bar 70. With this release, an operator, facing the right-hand (rear) edge of the platen, merely has to lift the platen slightly and draw it towards him until lip 30($l$) is removed from contact with shelf 52. Because of the lightness of the platen, this operation is performed within a matter of seconds. The platen is fully removed and a replacement platen mounted by reversing the procedure. The platen is held at a slight angle and the feed edge seated into position beneath the edge of shelf 52. The platen is lowered until it flexes over the top of bar 70 creating an upward bias force on edge 30($l$) forcing it into intimate contact with the bottom of shelf 52. The right edge lip 30($r$) is fixed into final position by replacing cover 62 and screws 64.

FIG. 1 shows the embodiment of the platen wherein a recess 80 is formed in the platen, preferably during the molding, or forming, process. The recess extends along the width of the platen and along the scan strip area 32 overlying the lens. The depth of the recess below the normal platen surface is approximately 1 mm. The purpose of the recess is to prevent the document from directly contacting the scan strip area 32 so as to reduce the abrasive effects of the document contacting the platen at this critical location.

Although the present invention has been described with particularity relative to the forgoing detailed description of the preferred embodiments, various modifications, changes and additions to the present invention, in addition to those mentioned herein, will be readily apparent to those having normal skill in the art without departing from the spirit of the invention. As one example, although the linear lens array disclosed herein is shown as a gradient index lens array, other suitable linear lens arrays may be used; e.g. a strip lens array of the type disclosed in U.S. Pat. No. 3,584,952 or a thick lens array of the type disclosed in European patent publication No. 0133788 published on Mar. 6, 1985. Finally, although the document is shown transported across the platen in a continuous velocity transport mode by feed rollers, it is understood that a recirculating document belt drive could be used to move the document across the platen surface. All of these various changes and modifications are intended to embrace the following claims.

What is claimed is:

1. A document imaging system comprising, in combination:
    a flexible transparent platen fixedly positioned in an object plane for supporting a document to be reproduced;
    means for incrementally scanning a document transported across said platen, said means including an optical illumination and imaging assembly for illuminating an incremental strip extending across the platen and for projecting a document image along an optical path onto a photosensitive image member; and
    means for moving said document across said platen.

2. The imaging system of claim 1 wherein said optical illumination and imaging system further includes a fixed elongated support bar having one end in contact with the bottom surface of said platen, the contacting end extending slightly and uniformly above the object plane along the platen width so as to flex the platen surface slightly upward along the contacting portion creating a bowed configuration along a portion of the platen.

3. In a document imaging system, a flexible, transparent platen fixedly positioned in an object plane for supporting a document to be reproduced;
    means for moving said document across an exposure zone formed along an incremental strip of said platen; and
    means for flexing the platen upward along at least one area transverse to the document motion.

4. The imaging system of claim 3 wherein said flexing means is a support bar extending the width of the platen, the top edge of the bar extending slightly above the object plane.

5. The imaging system of claim 1 wherein said platen has a recessed surface coincident with said incremental strip.

* * * * *